United States Patent [19]
Bosi et al.

[11] Patent Number: 5,848,391
[45] Date of Patent: Dec. 8, 1998

[54] METHOD SUBBAND OF CODING AND DECODING AUDIO SIGNALS USING VARIABLE LENGTH WINDOWS

[75] Inventors: Marina Bosi, Redwood City; Grant Davidson, Oakland; Charles Robinson, San Francisco, all of Calif.; Martin Dietz, Nürnberg, Germany; Uwe Gbur, Erlangen, Germany; Oliver Kunz, Sesslach, Germany; Karlheinz Brandenburg, Erlangen, Germany

[73] Assignees: Fraunhofer-Gesellschaft zur Forderung der Angewandten Forschung E.V., Munich, Germany; Dolby Laboratories Licensing Corp., San Francisco, Calif.

[21] Appl. No.: 678,666

[22] Filed: Jul. 11, 1996

[51] Int. Cl.$^6$ ........................................ G10L 5/00
[52] U.S. Cl. ............................ 704/500; 704/229
[58] Field of Search ...................... 704/229, 500

[56] References Cited

U.S. PATENT DOCUMENTS

| | | |
|---|---|---|
| 4,896,362 | 1/1990 | Veldhuis . |
| 5,109,417 | 4/1992 | Fielder et al. . |
| 5,115,240 | 5/1992 | Fujiwara et al. . |
| 5,166,686 | 11/1992 | Sugiyama . |
| 5,197,087 | 3/1993 | Iwahashi et al. . |
| 5,214,742 | 5/1993 | Edler . |
| 5,235,623 | 8/1993 | Sugiyama et al. . |
| 5,285,498 | 2/1994 | Johnston ...................... 381/2 |
| 5,299,238 | 3/1994 | Iwahashi et al. . |
| 5,299,239 | 3/1994 | Iwahashi et al. . |
| 5,299,240 | 3/1994 | Iwahashi et al. . |
| 5,361,278 | 11/1994 | Vaupel et al. ............... 375/122 |
| 5,394,473 | 2/1995 | Davidson ..................... 381/36 |
| 5,502,789 | 3/1996 | Akagiri . |

FOREIGN PATENT DOCUMENTS

| | | |
|---|---|---|
| 0 251 028 | 1/1986 | European Pat. Off. . |
| 0193 143 A2 | 9/1986 | European Pat. Off. . |
| 0 559 383 A1 | 9/1993 | European Pat. Off. ........... H04B 1/10 |
| 0 620 653 A2 | 10/1994 | European Pat. Off. ......... H03M 7/30 |
| 0 684 705 A2 | 11/1995 | European Pat. Off. .......... H04B 1/66 |
| WO 91/16769 | 10/1991 | WIPO .............................. H04B 1/66 |

OTHER PUBLICATIONS

Iwadare et al, "A 128 kb/s Hi–Fi Audio CODEC Based on Adaptive Transform Coding with Adaptive Block Size MDCT", *IEEE Journal on Selected Areas in Communications*, vol. 10, No. 1, pp. 138–144, Jan. 1992.

Davidson et al, "AC–2: High Quality Digital Audio Coding for Broadcast and Storage", *Dolby Technical Papers*, Publication No. S92/9433, pp. 1–8, 1992.

(List continued on next page.)

*Primary Examiner*—David R. Hudspeth
*Assistant Examiner*—Harold A. Zintel
*Attorney, Agent, or Firm*—Wolf, Greenfield & Sacks, P.C.

[57] ABSTRACT

A method of encoding time-discrete audio signals comprises the steps of weighting the time-discrete audio signal by means of window functions overlapping each other so as to form blocks, the window functions producing blocks of a first length for signals varying weakly with time and blocks of a second length for signals varying strongly with time. A start window sequence is selected for the transition from windowing with blocks of the first length to windowing with blocks of the second length, whereas a stop window sequence is selected for the opposite transition. The start window sequence is selected from at least two different start window sequences having different lengths, whereas the stop window sequence is selected from at least two different stop window sequences having different lengths. A method of decoding blocks of encoded audio signals selects a suitable inverse transformation as well as a suitable synthesis window as a reaction to side information associated with each block.

24 Claims, 7 Drawing Sheets

OTHER PUBLICATIONS

Sugiyama et al., "Adaptive Transform Coding with an Adaptive Block Size (ATC–ABS)", *IEEE* Proceedings Int. Conference on Acoustics, Speech, and Signal Processing pp. 1093–1096, Apr. 1990.

Princen et al., "Analysis/Synthesis Filter Bank Design Based on Time Domain Aliasing Cancellation" *IEEE Transactions on Acoustics, Speech, and Signal Processing*, vol. ASSP–34, No. 5, pp. 1153–1161, Oct. 1986.

Edler et al., "Coding of Audio Signals with Overlapping Block Transform and Adaptive Window Functions", Translation from Frequenz, vol. 43, No. 9, pp. 252–256, 1989.

Shlien, "The Modulated Lapped Transform, its Time–Varying Forms, and its Applications to Audio Coding Standards", *IEEE Transactions on Speech and Audio Processing*, vol. 5 No. 4, pp. 359–366, Jul. 1997.

Princen, et al. "Subband/Transform Coding Using Filter Bank Designs Based on Time Domain Aliasing Cancellation", *IEEE, Proceedings International Conference on Acoustics, Speech, and Signal Processing*, pp. 2161–2164, Apr. 1987.

Bosi, et al., High Quality, Low–Rate Audio Transform Coding for Transmission and Multimedia Applications, *Audio Engineering Society, Presented at the 93rd Convention 1992 Oct. 1–4 San Francisco*, pp. 1–21.

| NUMBER | NAME | NUMBER OF COEFFICIENTS | WINDOW SEQUENCE |
|---|---|---|---|
| 0) | ONLY_LONG | 1024 | 36 |
| 1) | LONG_START | 1024 | 32 |
| 2) | EIGHT_SHORT | 1024 | 40 |
| 3) | LONG_STOP | 1024 | |
| 4) | RESERVED | | 38 |
| 5) | SHORT_START | 1024 | 41 |
| 6) | STOP_START | 1024 | 42 |
| 7) | SHORT_STOP | 1024 | |

FIG. 1

METHOD SUBBAND OF CODING AND DECODING AUDIO SIGNALS USING VARIABLE LENGTH WINDOWS

FIELD OF THE INVENTION

The present invention refers to coding and decoding methods for audio signals and especially to the use of different window functions and synthesis window functions, respectively, in dependence upon the audio signal to be coded or the coded audio signal.

DESCRIPTION OF THE PRIOR ART

Modern audio coding methods, such as the methods according to the standard MPEG layer 3 or according to the standard MPEG2-NBC, which is in the standardization phase, produce blocks of encoded audio signals. As will already be evident from the name (NBC=non backward compatible), the above-mentioned standard MPEG2-NBC, which is in the standardization phase, need not be backward compatible. The present invention now refers to a further development within the framework of the future standard MPEG2-NBC.

Coding of an audio signal present in analog form, which results in most cases in substantial compression of the data, first requires sampling of said audio signal. In the description of the present invention, a sampling frequency of 48 kHz is used. This is, however, an arbitrary choice; it is also possible to use other sampling frequencies which are normally used for audio signals. After time sampling, the audio signal is present in the form of a time-discrete audio signal consisting of an equidistant sequence of individual sampling values. The time interval between one sampling value and the next is equal to the inverse of the sampling frequency used for sampling. According to the sampling theorem, the bandwidth of the analog signal must be restricted to half the sampling frequency in order to reconstruct unequivocally the analog signal from the sampled signal.

As has already been mentioned, audio coding methods, such as MPEG2-NBC, produce coded blocks of data. From the hitherto so to speak endless stream of time-discrete audio signals, successive blocks are produced by windowing with overlapping window functions. The window function can, for example, be a sine window. Those skilled in the art know, however, a large number of other possible window functions. When normal coding is carried out, the window length for MPEG2-NBC is 2048 sampling values.

The time length of a window function results from the product of the 2048 sampling values and the inverse of the sampling frequency; for the present example, a window length of 42.67 ms would be obtained, if the individual window functions did not overlap. MPEG2-NBC uses, however, a 50% overlap and a subsequent MDCT (MDCT= modified discrete cosine transform), and this results in blocks with 1024 frequency values per block. In view of the fact that the individual window functions overlap by 50%, it would be unnecessary to produce 2048 frequency values for each window function, since the resultant data would then, have a 50% redundancy. Hence, whenever a block of data, i.e. frequency values, is produced, two neighbouring window functions take part, which overlap and add. To sum up, it can be said that a window function has a time length of 2048 sampling values multiplied by the inverse of the sampling frequency, whereas a block has 1024 frequency values which are determined by overlap and add making use of two neighbouring window functions. The frequency values supplied by the MDCT must subsequently be quantized for digital further processing.

This quantization adds to the time-discrete audio signal a disturbance in the frequency range whose permitted magnitude was calculated in a psychoacoustic model of the encoder. In view of the fact that, due to the windowing carried out, the time resolution is predetermined, the quantization disturbance smears so to speak over the whole length of the time window.

The mutual distance between the 1024 frequency values for each block is equal to the quotient of half the sampling frequency and the number of sampling values. In order to guarantee that the energy conservation law is fulfilled, each spectral coefficient, i.e. each frequency value, has a bandwidth that corresponds to the above-mentioned quotient. The time resolution is equal to the inverse of the frequency resolution, i.e. equal to the quotient of the number of sampling values and the sampling frequency. Expressed in numerical values, at a sampling frequency of 48 kHz this time resolution is $1024 \cdot 1/48000$ s=21.33 ms. A quantization disturbance will, however; "smear" over a whole window, i.e. over a time period of $2 \cdot 21.33$ ms=42.66 ms.

In the case of audio signals signals varying strongly with time and having transient components, this poor time resolution may have the effect that the quantization disturbance distributed over this block becomes audible as a pre- or post-echo when the audio signals will be decoded later on.

In order to prevent the pre-echo or postecho disturbance, the overlapping long window functions, i.e. window functions with 2048 sampling values, are replaced by a plurality of overlapping short window functions in windows with signal regions that vary strongly with time. In order to guarantee correct coding, i.e. especially a correct overlap and add, with the shorter window functions subsequent to the longer window functions, the coding with shorter window functions must be initiated by a so-called start window sequence and terminated a so-called stop window sequence, since a block with frequency values is formed by the cooperation of two neighbouring overlapping window functions.

In the NBC encoder mentioned above, eight 50% overlapping window functions, which each have a length of 256 sampling values, are used. The time resolution is improved to $128 \cdot 1/48000$ s=2.67 ms in this way, whereby pre-echoes are essentially avoided. Here, too, there is a distribution of the quantization disturbance over a time domain which is twice as long, i.e. $2 \cdot 2.67$ ms=5.34 ms.

In FIG. 2, a known block sequence, i.e. a group of individual window function sequences, is shown which is obtained when switching over to a window function of shorter length is effected. The block sequence shown in FIG. 2 will be explained hereinbelow from the left to the right, whereby the horizontal line can be a section of the time axis. Prior to describing the block sequence, reference is made to the fact that, in order to make things clearer, the above-mentioned sine curve of the window function is shown in simplified form by straight lines in FIG. 2 and in all other figures. In actual fact, special window functions, such as those described in the standard MPEG1 (ISO111172-3) are used. An ascending straight line thus corresponds to the first half of e.g. a sine window function, whereas a descending straight line corresponds to the second half of a sine window function.

A descending line 10b in FIG. 2 represents the second half of a window function 10 for signals varying weakly with tine, i.e. the window function with e.g. 2048 sampling values. From said figure, it can be seen that a so-called long block 12 is formed by the overlap of the second half 10b of the long window function 10 and of an ascending line 14a of a start window sequence 14, i.e. a sequence of window functions including in addition to the ascending line 14a a constant part 14b and a descending line 14c, which is the same as the second half 16b of a short window function 16 for signals varying strongly with time. The start window sequence 14 is followed by eight short window functions 16, i.e. window functions for signals varying strongly with time, which are necessary for windowing transient audio signals so as to minimize the audibility of the quantization disturbances, as has already been described hereinbefore. These 50% overlapping short window functions, each comprising 256 sampling values, form a short block 13, which comprises 128 frequency values. The eight short window functions 16 are again followed by a stop window sequence 18 comprising first the first half 18a of the short window function 16, and then a constant part 18b and a descending line 18c, which is the same as the second half 10b of the long window function 10, i.e. the window function for signals varying weakly with time.

Due to the descending line 18c as well as the first half 10a of the long window function 10, it is now possible to produce correct frequency values also in block 12, extreme right in FIG. 6. The start window sequence 14 and the stop window sequence 18 therefore guarantee that, independently of the switching over of window functions, correct frequency values for a long block 12 and a short block 13, respectively, can be produced in areas with signals varying weakly with time and in areas with signals varying strongly with time. In all figures, the section of the time axis shown is subdivided into blocks of 1024 sampling values, each of said blocks being subdivided into eight units, whereby 128 sampling values or frequency values are obtained for one unit.

One disadvantage of the use of short window functions 16 for forming short blocks 13 is the fact that the coding efficiency of said short window functions is worse than that of long window functions; hence, it is attempted to avoid switching over from long window functions to short window functions as far as possible. In this connection, reference is made to the fact that side information, i.e. additional information, must be transmitted in addition to each data block transmitted, said side information indicating e.g. the window function which has been used for coding in connection with a specific block.

The start window sequence 14 shown in FIG. 2 and the stop window sequence 18 are mirror images of one another and they have the same length. A start-short-stop block sequence according to the prior art is comparatively long, the number of short window functions 16 being always fixed at eight short blocks so as to keep to the block raster of 1024. In an area 20, transients may occur. It is therefore not possible to switch less than eight short window functions, even if the length of the transient area is shorter than area 20.

Furthermore, due to the constant parts 14b, 18b, the start-short-stop-block sequence in FIG. 2 is comparatively long, and in the case of transients occurring at a time interval of some length it is therefore not possible to switch over again to a long window function between the transients. Hence, it is necessary to use more short window functions than necessary, whereby the coding efficiency is unnecessarily impaired. If the transient additionally occurs at the margins of the area in question, it will often be necessary to insert a second window sequence of eight short windows into the block sequence according to FIG. 6 in order to fully include said block sequence.

SUMMARY OF THE INVENTION

It is the object of the present invention to provide a coding method and a decoding method for audio signals which minimize the use of short blocks without causing a deterioration of the coded/decoded audio signals originating from quantization disturbances.

In accordance with a first aspect of the invention, this object is achieved by a method of encoding time-discrete audio signals, comprising the step of weighting the time-discrete audio signal by means of window functions overlapping each other so as to form blocks, said window functions producing blocks of a first length for signals varying weakly with time and blocks of a second length for signals varying strongly with time, a start window sequence being selected for a transition from windowing with blocks of said first length to windowing with blocks of said second length and a stop window sequence being selected for an opposite transition, wherein the start window sequence is selected from at least two different start window sequences and the stop window sequence is selected from at least two different stop window sequences.

In accordance with a second aspect of the invention, this object is achieved by a method of encoding time-discrete audio signals, comprising the step of weighting the time-discrete audio signal by means of window functions overlapping each other so as to form blocks, said window functions producing blocks of a first length for signals varying weakly with time and blocks of a second length for signals varying strongly with time, a start window sequence being selected for a transition from windowing with blocks of said first length to windowing with blocks of said second length and a stop window sequence being selected for an opposite transition, said window functions comprising a combined stop start window sequence which produces a block of the first length and which is situated between window-sequences producing blocks of the second length.

In accordance with a third aspect of the invention, this object is achieved by a method of decoding time-discrete audio signals encoded in blocks, said method comprising the following steps:

reading of side information with which said encoded blocks are provided, said side information referring to the window function which has been used in connection with the block in question and to the transformation which has been used with the block in question;

selecting an inverse transformation and a synthesis window function as a reaction to the side information read; and re-transforming and windowing with the selected inverse transformation and the selected synthesis window function.

The present invention is based on the finding that the coding efficiency can be increased considerably by providing a plurality of different start and stop window sequences of different lengths; in this connection, it is possible to selectively choose, depending on the time-discrete audio signals to be coded, a single start or stop window sequence for maximum avoidance of pre- and post-echoes caused by the quantization following the transformation.

Further a new combined STOP_START window sequence producing a long block permits a clearly reduced repetition time for switching short blocks compared to FIG. 2. This combined STOP_START window sequence ends a window sequence consisting of short window functions and serves as start window function for a further window sequence of short window functions.

It follows that the methods according to the present invention no longer rigidly demand fixed transformation lengths of e.g. 1024 values for the MDCT, but they permit the use of different transformation and retransformation lengths.

On the basis of the now admitted different transformation lengths as well as on the basis of a plurality of start and stop window sequences that can be chosen selectively, the methods for encoding and decoding according to the present invention can react flexibly and appropriately to areas of the time-discrete audio signal in which block lengths of 1024 values are too long.

BRIEF DESCRIPTION OF THE DRAWINGS

Preferred embodiments of the present invention will be explained hereinbelow more precisely, making reference to the drawings enclosed, in which:

FIG. 1 shows possible window sequences in the MPEG2-NBC coder/decoder;

DESCRIPTION OF THE PREFERRED EMBODIMENT OF THE INVENTION

Figure 2:
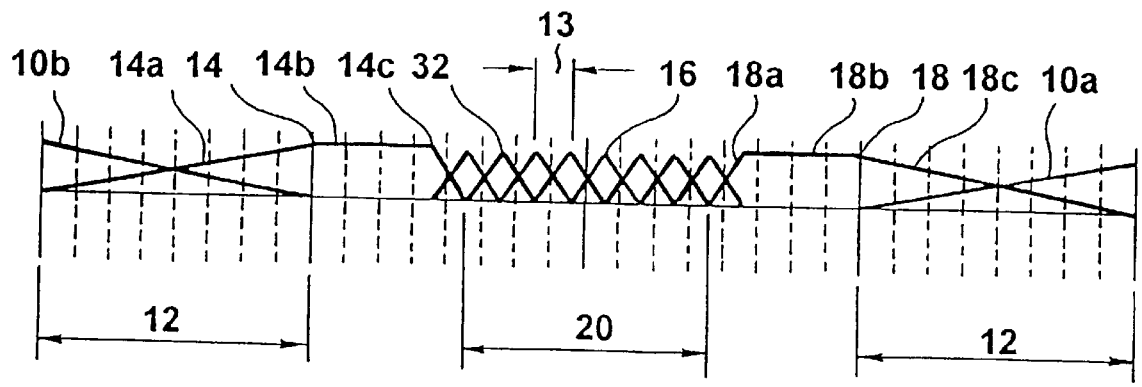
FIG. 2 shows a known window sequence for switching over from long window functions to short window functions and vice versa in the NBC coder.

FIG. 1 shows possible window sequences which can be used in the method according to the present invention for coding and decoding time-discrete audio signals according to the MPEG2-NBC standard. In the first column of FIG. 1, the number of the individual window sequences is shown; in this connection, reference is made to the fact that the seven possible window sequences can be coded by three bits; in comparison with the former standard MPEG layer 3, this only means one bit of additional side information per channel, since said standard already needs two bits for characterizing the window function used for a block.

The window sequence No. 4 is not occupied and is considered to be reserved.

In the second column of FIG. 1, the name of the window sequence shown in the fourth column appears, whereas the third column shows the number of spectral coefficients for each window sequence. As has already been mentioned, the window sequence by means of which pre- and post-echoes can be avoided best is selected from the various extended window sequences in the encoder. In accordance with the present invention, this can be done in a much more selective manner than in the case of conventional encoders. The length of the MDCT required and thus the maximum number of quantized frequency lines to be transmitted is 1024 for each sequence.

After windowing, an MDCT having the length determined is executed. In accordance with a preferred embodiment of the present invention, a plurality of MDCTs having different lengths (i.e. numbers of spectral coefficients) can be called, the frequency values of said MDCTs being then juxtaposed. The fifth sequence in FIG. 1 requires an MDCT having a length of 640 and, in addition, three MDCTs each having a length of 128 spectral coefficients, whereby the shown number of 1024 spectral coefficients is obtained. It follows that the present invention permits varying transformation lengths and, consequently, also varying block lengths.

In the first line having number in FIG. 1, the long window function 10, which is named ONLY_LONG and which has already been described, is shown, said window function 10 being composed of the ascending first half 10a and of the descending second half 10b. This window function 10 is the window function which normally is to be used for audio signals varying weakly with time. In this connection, it is pointed out that the expression window sequence actually stands for a sequence of window functions. Although the window function 10 consists of only one window function, it will be referred to as window sequence ONLY_LONG 10 hereinbelow for reasons of consistency. Hence, a window function within the meaning of the present application can comprise only one window function or also a sequence of window functions.

If this window sequence ONLY_LONG 10 is not suitable for interference-free coding of audio signals, since said audio signals vary strongly with time, a change-over to the short window function 16 must be carried out for the purpose of coding. The window sequence EIGHT_SHORT 32 represents a sequence of eight short window functions for interference-free coding of audio signals varying rapidly with time.

In accordance with a preferred embodiment according to the present invention, the short window functions 16 as well as the long window functions 10 each overlap by 50%. In order to achieve perfect coding of the overlapping window functions, a sequence of short window functions can be initiated by means of a start window sequence, such as the start window sequence LONG_START 36 or the start window sequence SHORT_START 38. The start window sequence LONG_START 36 corresponds to the start window sequence 14, which has been described in connection wits FIG. 2.

The start window sequence SHORT_START 38 consists of the first half 10a of the window function 10 and of three short window functions 16, a constant window segment 19, the length of which corresponds to 64 sampling values followed by the second half 16b of a short window function 16 being located at the transition from the first half 10a of the window function 10 to the overlapping three short window functions 16. The start window sequence SHORT_START 38 comprises three short window functions 16 that are already integrated therein.

The method according to the present invention permits the use of two stop window sequences LONG_STOP 40 and SHORT_STOP 42. The stop window sequence LONG_STOP 40 is identical to the stop window sequence 18 shown in FIG. 2. The stop window sequence SHORT_STOP 42 is analogous to the start window sequence SHORT_START 38.

Line 6 in FIG. 1 shows a combined STOP_START window sequence 41 comprising a first part which corresponds to the first half 16a of a short window function, a constant second part with a length of 7×128 sampling values as well as a third part which corresponds to the second half 16b of a short window function. The combined STOP_START window sequence 41 can be switched between short window functions which produce short blocks. The STOP_START window sequence 41 produces a long block as it is shown in column 3 of FIG. 1.

In principle, all possible combinations, i.e. block sequences, consisting of a start window sequence 36, 38, an arbitrary number (n,m) of the window sequence 32 and a stop window sequence 40 can be used. In accordance with a preferred embodiment of the present invention, only the following combination, are, however, used. Despite the varying positions of the short window functions the preferred raster including e.g. 1024 spectral coefficients is always maintained. The combinations used are therefore the following ones:

TABLE 1

| start window sequence | window sequence | stop window sequence |
| --- | --- | --- |
| SHORT_START 38 | | SHORT_STOP 42 |
| SHORT_START 38 | n*EIGHT_SHORT 32 | SHORT_STOP 42 |
| LONG_START 36 | n*EIGHT_SHORT 32 | LONG_STOP 40 |
| LONG_START 36 | n*EIGHT_SHORT 32, STOP_START 41, m*EIGHT_SHORT 32 | LONG_STOP 40 |
| SHORT_START 38 | | LONG_STOP 40 |
| SHORT_START 38 | n*EIGHT_SHORT 32 | LONG_STOP 40 |
| LONG_START 36 | | SHORT_STOP 42 |
| LONG_START 36 | n*EIGHT_SHORT 32 | SHORT_STOP 42 |
| SHORT_START 38 | STOP_START 41 | SHORT_STOP 42 |

In the following, some exemplary block sequences will be described, which can be formed by the window sequences shown in FIG. 1.

FIG. 2 shows the previously used block sequence which has already been described. This can be composed of the window sequences LONG_START 36, EIGHT_SHORT 32 and LONG_STOP 40. Reference numeral 20 again indicates the area in which transients may exist in the audio signal.

Figure 3:
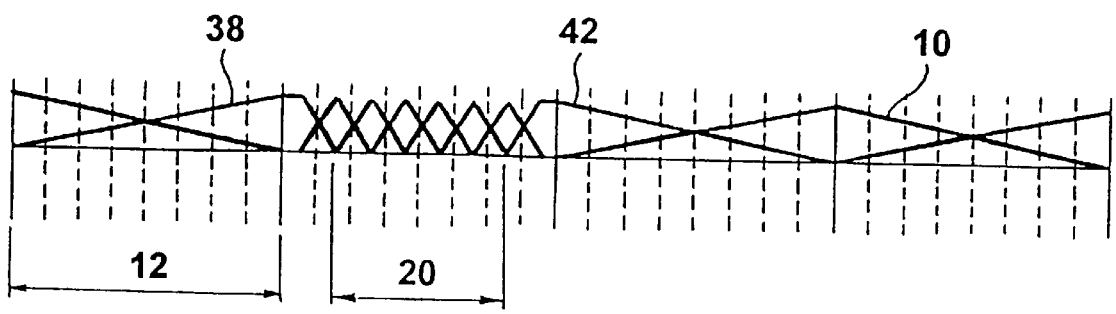
FIG. 3 shows an example of a window sequence according to the present invention.

The present invention, however, does not demand a window sequence which is symmetrical with regard to the block boundary, as shown e.g. in FIG. 3. FIG. 3 is a combination of the window shapes SHORT_START 38 and SHORT_STOP 42. This block sequence now comprises six short blocks 13. It follows that, in comparison with the conventional method shown in FIG. 2, it is possible to correctly encode a transient event in six short blocks 13 with six short window functions, instead of encoding it in eight blocks with eight short window functions. When the known method according to FIG. 2 is used, 1024 frequency coefficients are obtained for start and stop as well as for each of the eight short windows, whereby the block raster is always observed.

Unlike this the block sequence according to FIG. 3 permits now the windowing of a transient event in the area 20 comprising only 2×1024 spectral coefficients, whereby the block raster is always observed as well.

In FIG. 3, it can be seen that the short window sequences cover areas for transients concerning the block raster which overlap regarding FIG. 2, whereby transients can be incorporated much more specifically. It follows that, according to the present invention, it is possible to cover any transient by a maximum of six or eight short blocks. In connection with the known method according to FIG. 2, it was often necessary to use two successive window sequences each consisting of eight short blocks.

Furthermore, in comparison with the known method according to FIG. 2, the block sequence in FIG. 3 has a considerably reduced repetition time, i.e. between closely spaced transients it is possible to switch back to long blocks far faster than in the case of FIG. 2.

Figure 6:
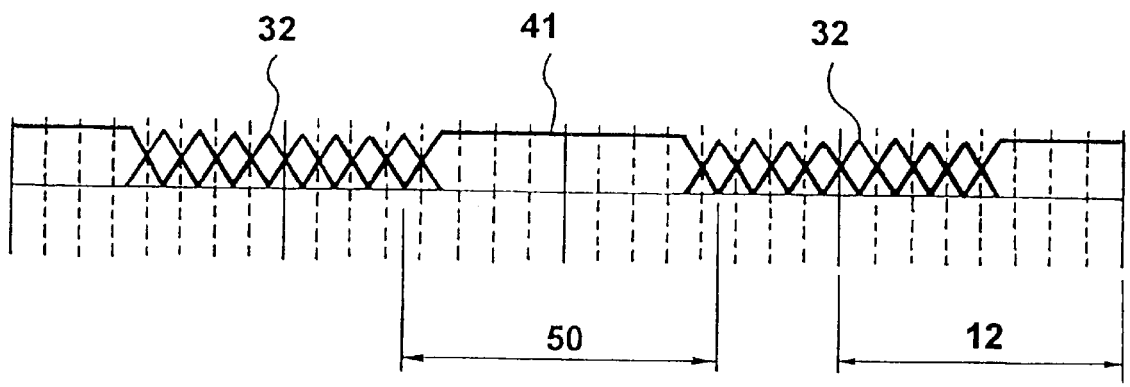
FIG. 6 shows an example of a block sequence according to the present invention for reducing the repetition time of the method shown in FIG. 2.

By introducing the combined START_STOP window sequence 41 also repetition time 50 of the known method for switching blocks which is described by FIG. 2 can be reduced considerably. This is shown in FIG. 6 and is described later on.

The block sequence start-stop in FIG. 3 is followed by the long window sequence ONLY_LONG 10, which is used for encoding signals that vary weakly with time. At this point, reference is made to the fact that the terminology "varying weakly with time" and "varying strongly with time" are only relative terminologies; in accordance with a special embodiment, a so-called transient threshold is predetermined at which the window function used is changed. This transient threshold will depend on the window length of the long window function.

Figure 4:
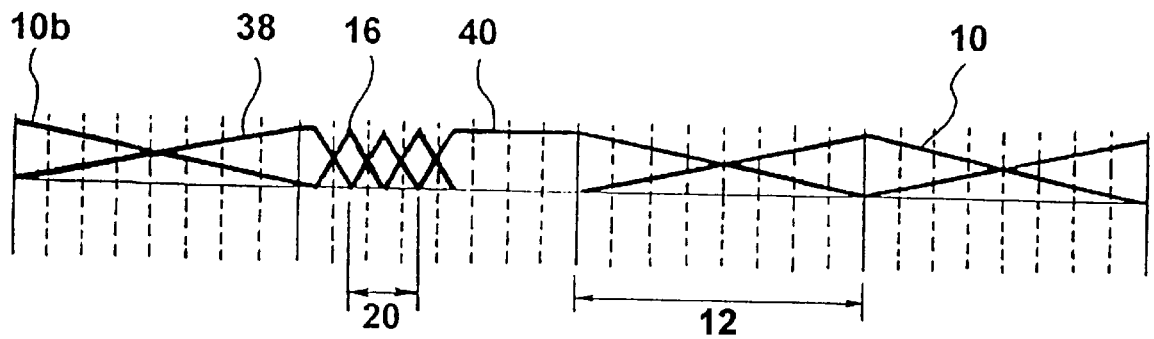
FIG. 4 and FIG. 5 show examples of window sequences according to the present invention including a minimum number of short blocks.
Figure 5:
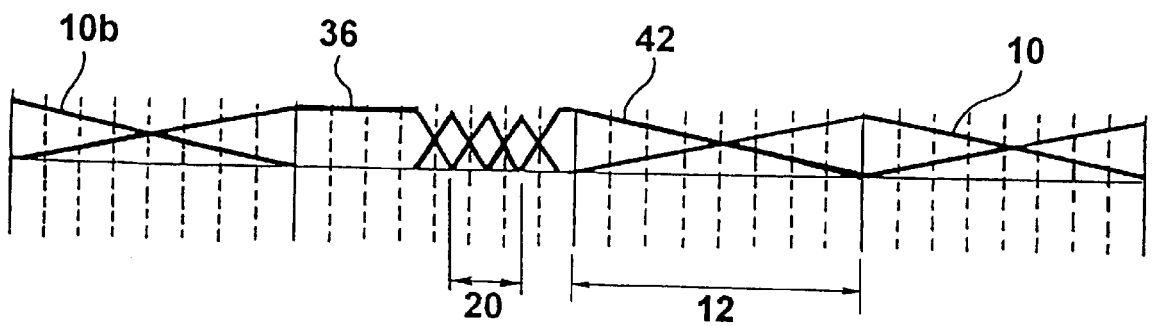

FIGS. 4 and 5 represent a further improvement of the coding efficiency. FIG. 4 is essentially composed of the start window sequence SHORT_START 36 and the stop window sequence LONG_STOP 40. In this example, the number of short windows is only three blocks. It follows that short transient events can be encoded with only three short window functions 16. In comparison with FIG. 2, this represents a considerable reduction of the short window functions, whereby the number of short window functions and, consequently, also the number of short blocks 13 is minimized. Furthermore, the block sequence shown in FIG. 2 corresponds to the length of two long blocks 12 so as to be able to return to the long window function, whereas in FIG. 4 switching over is, like in FIG. 3, finished after the length of one block.

Another possible variation is shown in FIG. 5. Because of a transient area in the time-discrete audio signal, switching over from a long window function to short window functions 16 is effected. This is initiated by the start window sequence LONG_START 36 and finished by the stop window function SHORT_STOP 42 which already includes three short window functions 16. Hence, FIG. 4 and FIG. 5 clearly show that a large number of transient events in the time-discrete audio signal is now covered by only three short window functions 16, i.e. three short blocks 13. As a result, the coding efficiency can be increased still further, as has already been mentioned.

As the block sequences according to FIGS. 4 and 5 cover different time areas regarding the block raster, many transient areas can be covered by them. According to the prior art of FIG. 2 it is only possible to window transient events symmetrically to the limit of the block by means of short window functions, whereas the block sequence of FIG. 4 can window transient events in the first half of a long block and the block sequence of FIG. 5 can window transient events in the second half of a long block.

As already mentioned, FIG. 6 shows a block sequence which achieves a reduced repetition time 50 by introducing the combined STOP_START window sequence for the known method according to FIG. 2. The start window sequence LONG_START 36 is followed by the window sequence EIGHT_SHORT 32. Same is finished by the window sequence STOP_START 41 which at the same time serves as start window sequence for a further window sequence EIGHT_SHORT finished then by the stop window sequence LONG_STOP.

Figure 7:
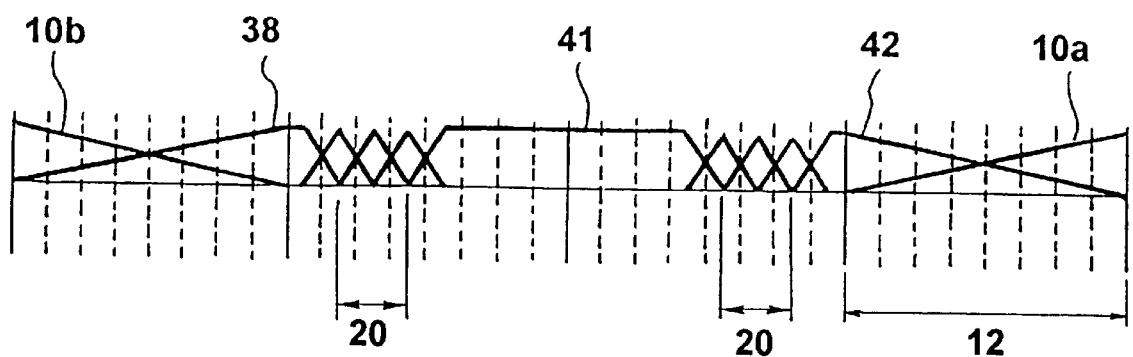
FIG. 7 shows an example of a block sequence according to the present invention for reducing the repetition time between two transient events.

FIG. 7 shows a block sequence which enables a minimum number of short blocks for a transient event as well as a minimum switching time. The window function ONLY_LONG 10 for signals slowly varying in time is followed by the start window sequence SHORT_START 38 which already comprises three short window functions. The combined window sequence STOP_START 41 finishes the sequence of short window functions and at the same time initiates a further sequence of three short window functions which are included in the stop window sequence SHORT_STOP 42.

To sum up, it can be stated that all block sequences shown in FIGS. 2 to 7 can be produced by making use of the window sequences shown in FIG. 1. As has already been stated in connection with table 1, it is also possible to produce block sequences with an arbitrary number of additional window sequences EIGHT_SHORT 32. Coding of unsuitable signals may necessitate this. Due to its flexibility, the "syntax" for the formation of block sequences shown in FIG. 1 permits this easily. The element 4 which is not yet occupied can be used for extensions which have not yet been implemented.

Figure 8A:
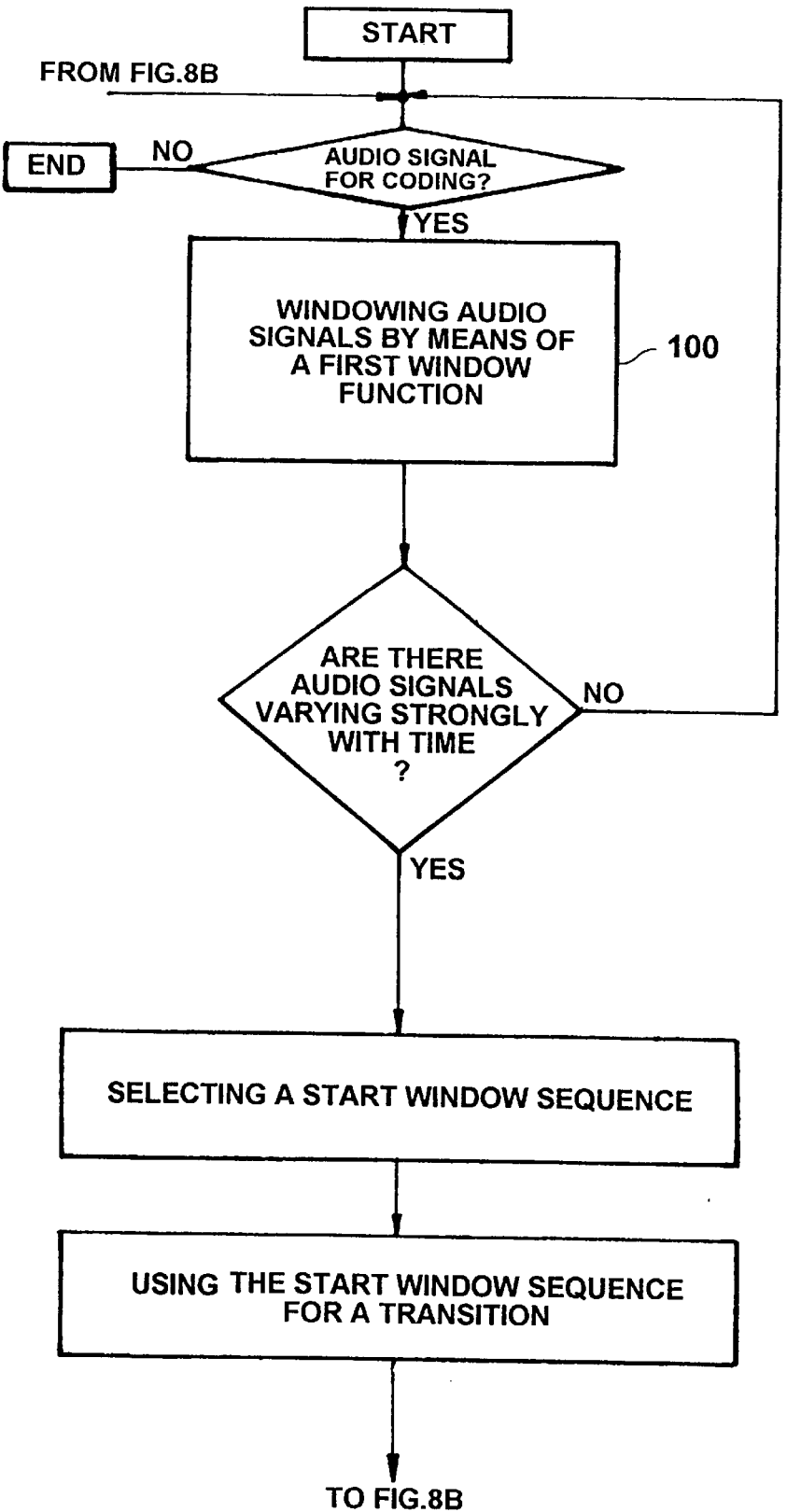
FIGS. 8A and 8B show a flow diagram of the method for encoding audio signals.
Figure 8B:
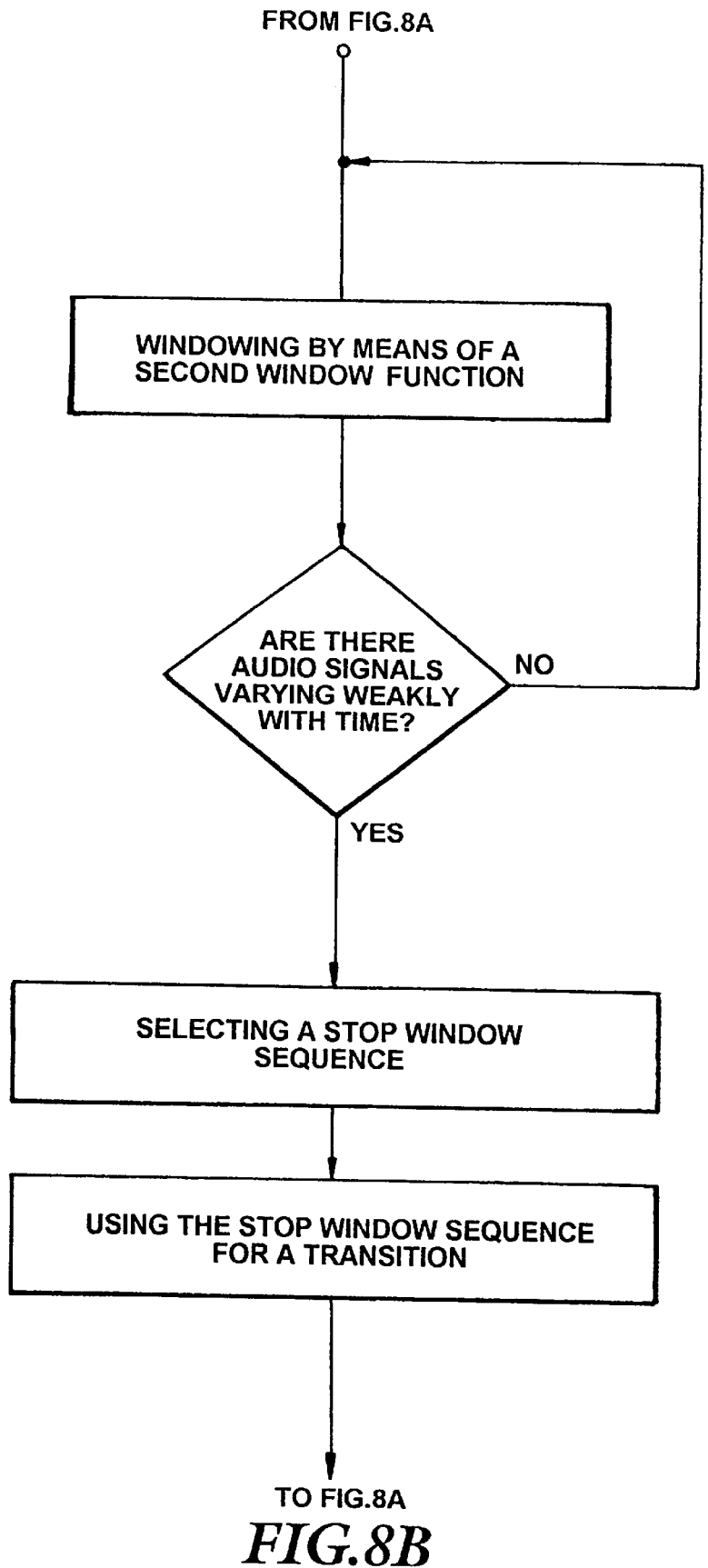

As has already been mentioned, seven different window sequences are specified in FIG. 1; said window sequences can be identified by three bits in the bit stream. If the area to be transmitted contains short blocks, these are grouped together because the items of side information would be too large if they were not combined. How many blocks are grouped together in each individual case is determined algorithmically. This information is then also transmitted to the decoder by means of additional side information bits. Within a group of short blocks, the spectrum is then re-sorted. As has already been mentioned at the very beginning, the spectral values, i.e. the frequency values, are quantized taking into account the psychoacoustically permitted disturbance. This quantization is, however, no longer influenced by the method, shown in FIGS. 8A and 8B, according to the present invention.

Figure 9:
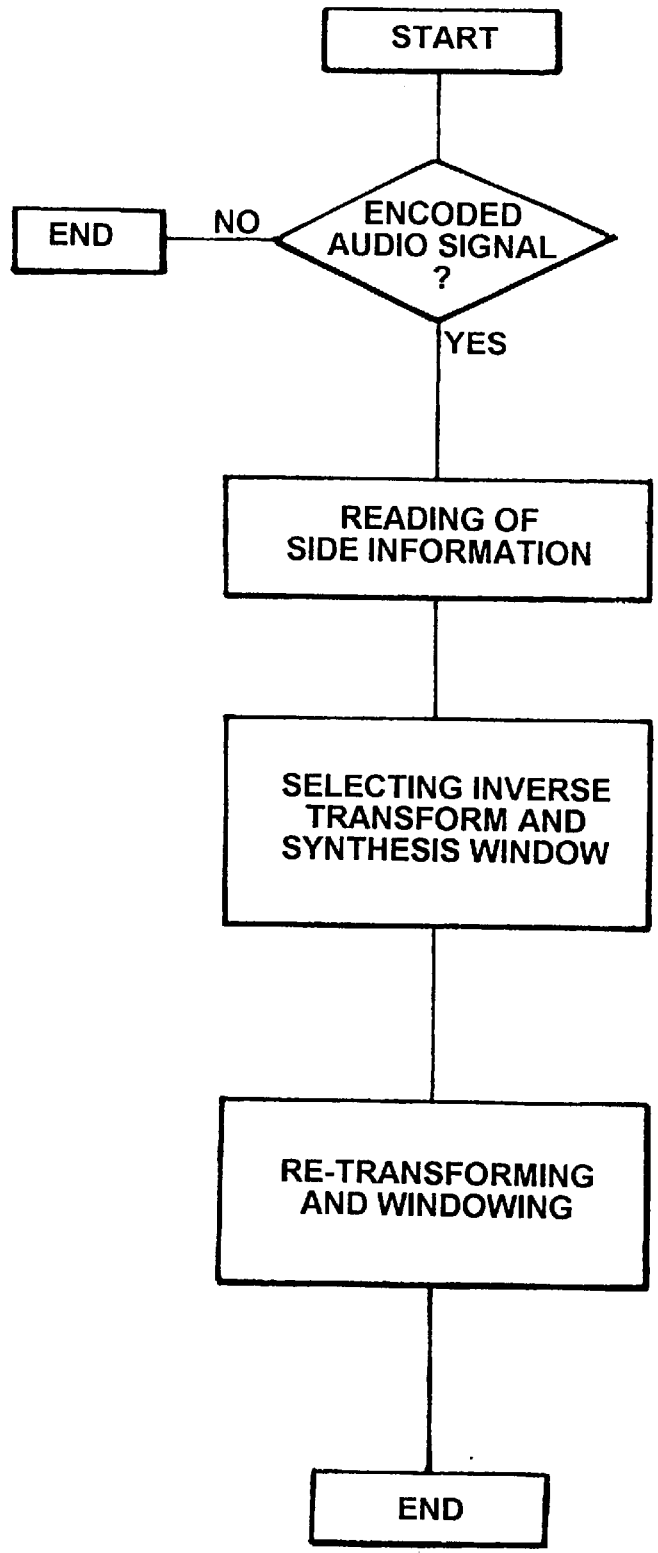
FIG. 9 shows a flow diagram of a method for decoding audio signals.

The decoder, which carries out a method of decoding the encoded audio signal, shown in FIG. 9, annuls all the signal modifications which have been carried out in the encoder. For this purpose, the frequency valves must first be rescaled and the quantization of said frequency values must be annulled, i.e. they must be requantized. Subsequently, they must be resorted so as to annul the spectral sorting. Following this, retransformation can be carried out making use of the inverse MDCTs (IMDCTs) specified by the side information. After selection of one of the synthesis window functions associated with the window function used and subsequent synthesis windowing as well as the taking into account of the overlap and add, the decoded discrete sampling values of the audio signal are obtained again.

We claim:
1. A method of encoding time-discrete audio signals including weighting the time-discrete audio signals by means of window functions overlapping each other so as to form blocks, said window functions comprising a first window function including a first half and a second half for producing blocks of a first length for signals varying weakly with time and a second window function including a first half and a second half for producing blocks of a second length for signals varying strongly with time, said method comprising:

applying said first window function, to said time-discrete audio signals to produce blocks of said first length;

upon detecting signals varying strongly with time, applying one start window sequence from a plurality of different start window sequences to effect a transition from producing blocks of said first length to producing blocks of said second length, one of said start window sequences including a first part corresponding to said first half of said first window function, a second non-overlapping part having a length, a third part corresponding to said second half of said second window function, and a fourth part having at least one said overlapping second window function;

upon detecting signals varying weakly with time, applying one stop window sequence from a plurality of different stop window sequences to effect a transition producing blocks of said second length to producing blocks of said first length, one of said stop window sequences comprising a first part having at least one overlapping second window function, a second part corresponding to said first half of said second window function; a third non-overlapping part having a length; and a fourth part corresponding to said second half of said first window function; and wherein, said length of said non-overlapping part and said overlapping second window functions are selected in a manner that a number of frequency coefficients obtained by a frequency transform of said time-discrete audio signals windowed by said start window sequence and said stop window sequence is equal to a number of frequency coefficients obtained by said frequency transform of time-discrete audio signals windowed by said first window function.

2. A method according to claim 1, wherein said start window sequence and said stop window sequence are not a mirror image of each other.

3. A method according to claim 1, wherein the first window function has the second half overlapping with the first half of the subsequent first window function and the second window function has the second half overlapping with the first half of the subsequent second window function, thereby said window functions windowing twice as many time-discrete signal values as there are frequency coefficients.

4. A method according to claim 1, wherein said applying includes said start window sequence including said fourth part having three said overlapping second window functions.

5. A method according to claim 1, wherein said applying includes said stop window sequence including said first part having three said overlapping second window functions.

6. A method of encoding time-discrete audio signals including weighting the time-discrete audio signals by means of window functions overlapping each other so as to form blocks, said window functions comprising a first window function, including a first half and a second half, for producing blocks of a first length for signals varying weakly with time and a second window function, including a first half and a second half, for producing blocks of a second length for signals varying strongly with time, said method comprising:

applying said first window function to said time-discrete audio signals to produce blocks of said first length; and upon detecting signals varying strongly with time, applying a start window sequence to effect a transition from producing blocks of said first length to producing blocks of said second length; said start window sequence including a first part corresponding to said first half of said first window function, a second non-overlapping part having a length, a third part corresponding to said second half of said second window function, and a fourth part having at least one said overlapping second window function;

wherein said length of said non-overlapping part and said overlapping second window functions are selected in a manner that a number of frequency coefficients obtained by a frequency transform of said time-discrete audio signals windowed by said start window sequence is equal to a number of frequency coefficients obtained by said frequency transform of time-discrete audio signals windowed by said first window function.

7. A method of encoding time-discrete audio signals including weighting the time-discrete audio signals by means of window functions overlapping each other so as to form blocks, said window functions comprising a first window function, including a first half and a second half, for producing blocks of a first length for signals varying weakly with time and a second window function, including a first half and a second half, for producing blocks of a second length for signals varying strongly with time, said method comprising:

applying said second window function to said time-discrete audio signals to produce blocks of said second length;

upon detecting signals varying weakly with time, applying a stop window sequence to effect a transition from producing blocks of said second length to producing blocks of said first length, said stop window sequence including a first part having at least one said overlapping second window function, a second part corresponding to said first half of said second window function, a third non-overlapping part having a length, and a fourth part corresponding to said second half of said first window function;

wherein said length of said non-overlapping part and said overlapping second window functions are selected in a manner that a number of frequency coefficients obtained by a frequency transform of said time-discrete audio signals windowed by said stop window sequence is equal to a number of frequency coefficients obtained by said frequency transform of time-discrete audio signals windowed by said first window function.

8. A method according to claim 1, wherein said applying said start window sequence includes using said start window sequence including fourth part consisting of three said overlapping second window functions, and said stop window sequence including first part with consisting of three said overlapping second window functions.

9. A method according to claim 1, wherein said applying said start window sequence includes using said start window sequence including said fourth part consisting of three said overlapping second window functions, at least one window sequence including eight said overlapping second window functions, and said stop window sequence including said first part with three said overlapping second window functions.

10. A method according to claim 6, wherein said applying said start window sequence includes using said start window sequence including said fourth part having three said overlapping second window functions.

11. A method according to claim 7, wherein said applying said stop window sequence includes using said stop window sequence including said first part having three said overlapping second window functions.

12. A method according to claim 1, wherein said applying said start window sequence includes using said start window sequence including said fourth part consisting of three said overlapping second window functions, and said applying said stop window sequence includes using said stop window sequence including said first part which corresponds to said first half of said second window function.

13. A method according to claim 1, wherein said applying said start window sequence includes using said start window sequence including said fourth part consisting of three overlapping second window functions, at least one window sequence consisting of eight overlapping said second window functions, and said applying said stop window sequence includes using said stop window sequence including said first part which corresponds to said first half of said second window function.

14. A method according to claim 1, wherein said applying said start window sequence includes using said start window sequence including a first part corresponding to said first half of said first window function, a constant second part, and a fourth part which corresponds to said second half of said second window function, and said applying said stop window sequence includes using said stop window sequence including said first part having three said overlapping second window functions.

15. A method according to claim 1, wherein said applying said start window sequence includes using said start window sequence including a fourth part which corresponds to said second half of said second window function, at least one window sequence including eight overlapping second window functions, and said applying said stop window sequence includes using said stop window sequence including said first part having three said overlapping second window functions.

16. A method of encoding time-discrete audio signals including weighting the time-discrete audio signals by means of window functions overlapping each other so as to form blocks, said window functions comprising a first window function including a first half and a second half for producing blocks of a first length for signals varying weakly with time and a second window function including a first half and a second half for producing blocks of a second length for signals varying strongly with time, said method comprising:

windowing said time-discrete audio signals by employing said first window function producing blocks of said first length;

upon detecting transient signals applying a start window sequence to achieve a transition from windowing with blocks of said first length to windowing with blocks of said second length and subsequently applying a stop window sequence for an opposite transition, wherein said start or stop window sequence includes a segment having a non-overlapping length and another segment having a number of said second window functions being overlapped, said non-overlapping length and said number of said overlapping second window functions are selected in a manner that a number of frequency coefficients obtained by a frequency transform of said time-discrete audio signals windowed by said start window sequence and said stop window sequence is equal to a number of frequency coefficients obtained by said frequency transform of time-discrete audio signals windowed by said first window function.

17. A method according to claim 16, wherein said applying includes said start window sequence including a first part corresponding to said first half of said first window function and a last part which corresponds to said second half of said second window function said stop start window sequence includes a first part having said number of overlapping second window functions.

18. A method according to claim 16, wherein said applying includes said start window sequence including a first part which corresponds to said first half of said second window function and a last part having said number of overlapping second window functions and said stop window sequence including a first part having said first half of said second window function.

19. A method of decoding time-discrete audio signals encoded in blocks, said method comprising the following steps:

reading of side information with which said encoded blocks are provided, said side information referring to a first or second window function, a start window sequence or a stop window sequence which has been used in connection with the block in question and to the transform which has been used with the block in question, wherein said start or stop window sequence includes a segment having a non-overlapping length and another segment having a number of said second window functions being overlapped, said non-overlapping length and said number of said overlapping second window functions are selected in a manner that a number of frequency coefficients obtained by a frequency transform of said time-discrete audio signals windowed by said start window sequence and said stop window sequence is equal to a number of frequency coefficients obtained by said frequency transform of time-discrete audio signals windowed by said first window function;

selecting an inverse transform and a synthesis window function as a reaction to the side information read; and re-transforming and windowing with the selected inverse transform and the selected synthesis window function.

20. A method of decoding time-discrete audio signals encoded in blocks according to claim 19, wherein, during coding, the time-discrete audio signals were weighted by means of said window functions overlapping one another so as to form blocks of a first length for signals varying weakly with time and blocks of a second length for signals varying strongly with time, said start window sequence was selected for a transition from windowing with blocks of said first length to windowing with blocks of said second length and said stop window sequence was selected for an opposite transition.

21. A method of decoding time-discrete audio signals encoded in blocks according to claim 19, wherein, during coding, the time-discrete audio signals were weighted by means of said window functions overlapping one another so as to form the blocks, the window functions produced blocks of a first length for signals varying weakly with time and blocks of a second length for signals varying strongly with time, said start window sequence was selected for a transition from windowing with blocks of said first length to windowing with blocks of said second length and said stop window sequence was a selected for an opposite transition, and a combined stop start window sequence which produces a block of the first length was situated between said start and stop window sequences and between window functions producing blocks of the second length.

22. A method of encoding time-discrete audio signals including weighting the time-discrete audio signals by means of window functions overlapping each other so as to form blocks, said window functions comprising a first window function including a first half and a second half for producing blocks of a first length for signals varying weakly with time and a second window function including a first half and a second half for producing blocks of a second length for signals varying strongly with time, said method comprising the steps of:

windowing said time-discrete audio signals by employing said first window function producing blocks of said first length;

upon detecting signals varying strongly with time, selecting a start window sequence from at least two different start window sequences for transition from windowing with blocks of said first length to windowing with blocks of said second length, one of said start window sequences including a first part corresponding to said first half of said first window function, a second non-overlapping part having a length, a third part corresponding to said second half of said second window function, and a fourth part having a number of overlapped said second window functions;

employing said selected start window sequence for a transition from windowing with blocks of said first length to windowing with blocks of said second length; and upon detecting signals varying weakly with time, selecting a stop window sequence from at least two different stop window sequences for transition from windowing with blocks of said second length to windowing with blocks of said first length, one of said stop window sequences including a first part having a number of overlapped said second window functions, a second part corresponding to said first half of said second window function, a third non-overlapping part having a length, and a fourth part corresponding to said second half of said first window function;

wherein, said length of said non-overlapping part and said number of said overlapping second window functions are selected in a manner that a number of frequency coefficients obtained by a frequency transform of said time-discrete audio signals windowed by said start window sequence and said stop window sequence is equal to a number of frequency coefficients obtained by said frequency transform of time-discrete audio signals windowed by said first window function.

23. A method of encoding time-discrete audio signals including weighting the time-discrete audio signals by means of window functions overlapping each other so as to form blocks, said window functions comprising a first window function, including a first half and a second half, for producing blocks of a first length for signals varying weakly with time and a second window function, including a first half and a second half, for producing blocks of a second length for signals varying strongly with time, said method comprising:

windowing said time-discrete audio signals by employing said first window function producing blocks of said first length; and upon detecting signals varying strongly with time, employing a start window sequence for a transition from windowing with blocks of said first length to windowing with blocks of said second length; said start window sequence including a first part corresponding to said first half of said first window function, a second non-overlapping part having a length, a third part corresponding to said second half of said second window function, and a fourth part having a number of said second window functions being overlapped;

wherein said length of said non-overlapping part and said number of said overlapping second window functions are selected in a manner that a number of frequency coefficients obtained by a frequency transform of said time-discrete audio signals windowed by said start window sequence is equal to a number of frequency coefficients obtained by said frequency transform of time-discrete audio signals windowed by said first window function.

24. A method of encoding time-discrete audio signals including weighting the time-discrete audio signals by means of window functions overlapping each other so as to form blocks, said window functions comprising a first window function, including a first half and a second half, for producing blocks of a first length for signals varying weakly with time and a second window function, including a first half and a second half, for producing blocks of a second length for signals varying strongly with time, said method comprising:

windowing said time-discrete audio signals by employing said second window function producing blocks of said second length; and upon detecting signals varying weakly with time, employing a stop window sequence for transition from windowing with blocks of said second length to windowing with blocks of said first length, said stop window sequence including a first part having a number of said second window functions being overlapped, a second part corresponding to said first half of said second window function, a third non-overlapping part having a length and a fourth part corresponding to said second half of said first window function;

wherein, said length of said non-overlapping part and said number of said overlapping second window functions are selected in a manner that a number of frequency coefficients obtained by a frequency transform of said time-discrete audio signals windowed by said stop window sequence is equal to a number of frequency coefficients obtained by said frequency transform of time-discrete audio signals windowed by said first window function.

\* \* \* \* \*